United States Patent [19]

Wilhelm

[11] Patent Number: 5,230,523
[45] Date of Patent: Jul. 27, 1993

[54] MULTI-FUNCTIONAL CHILD CARRIER DEVICE

[76] Inventor: James E. Wilhelm, 4542 W. 400 South, Huntington, Ind. 46750

[21] Appl. No.: 738,265

[22] Filed: Jul. 31, 1991

[51] Int. Cl.$^5$ .......................... B60F 5/00; B62B 7/06; B62B 7/12

[52] U.S. Cl. .................................... 280/30; 280/643; 280/648; 280/47.36; 280/47.38; 280/87.051; 297/3; 297/133; 297/250; 297/443; 5/105

[58] Field of Search ............ 280/30, 31, 47.36, 47.38, 280/87.051, 642, 643, 648, 650, 658; 297/3, 430, 133, 135, 153, 191, 250, 270, 443; 5/105, 107

[56] References Cited

U.S. PATENT DOCUMENTS

| | | | |
|---|---|---|---|
| 134,630 | 1/1873 | Bechler | 280/47.38 X |
| 1,302,343 | 4/1919 | Farrer | 280/47.38 X |
| 1,325,630 | 12/1919 | Fair | 297/191 X |
| 1,353,066 | 9/1920 | Pascoe | 297/3 |
| 2,025,393 | 12/1935 | Kupfer | 297/191 X |
| 2,269,834 | 1/1942 | Wagner | 297/270 X |
| 2,349,766 | 5/1944 | Simjian | 297/191 X |
| 2,482,827 | 9/1949 | Black | 280/30 |
| 2,530,474 | 11/1950 | Lutes | 297/133 X |
| 2,560,108 | 7/1951 | Hieb | 297/3 |
| 2,560,963 | 7/1951 | Kornegay | 297/270 X |
| 2,640,597 | 6/1953 | Thomson | 297/135 X |
| 2,661,959 | 12/1953 | Bell | 280/47.33 X |
| 2,709,479 | 5/1955 | Rieger | 297/3 |
| 2,722,966 | 11/1955 | Belyeu | 280/30 |
| 2,805,076 | 9/1957 | Thomas | 280/41 |
| 2,969,830 | 1/1961 | Thompson | 280/30 |
| 2,982,562 | 5/1961 | Gladstein | 280/30 X |
| 3,079,162 | 2/1963 | Michels, Jr. | 280/30 X |
| 3,290,050 | 12/1966 | Ezquerra | 280/30 |
| 3,549,164 | 12/1970 | Raynor | 280/30 |
| 3,567,275 | 3/1971 | Bukey | 297/133 |
| 3,794,379 | 2/1974 | Furey | 297/250 |
| 3,944,241 | 3/1976 | Epelbaum | 280/30 |
| 4,306,749 | 12/1981 | Deloustal | 297/440 |
| 4,342,465 | 8/1982 | Stillings | 280/87.051 |
| 4,345,791 | 8/1982 | Bryans et al. | 297/250 |
| 4,593,950 | 6/1986 | Infanti | 297/3 |
| 4,664,396 | 5/1987 | Pietrafesa | 280/30 |
| 4,685,688 | 8/1987 | Edwards | 280/30 |
| 4,733,909 | 3/1988 | Single, II et al. | 297/250 |
| 4,743,063 | 5/1988 | Foster, Jr. | 297/130 |
| 4,786,064 | 11/1988 | Baghdasarian | 280/30 |
| 4,874,182 | 10/1989 | Clark | 280/30 |
| 4,902,026 | 2/1990 | Maldonado | 280/30 |
| 4,921,261 | 5/1990 | Sadler, Jr. et al. | 280/30 |
| 4,989,888 | 2/1991 | Qureshi et al. | 280/30 |
| 5,011,221 | 4/1991 | Wise | 297/191 |
| 5,052,750 | 10/1991 | Takahashi et al. | 297/250 |

FOREIGN PATENT DOCUMENTS

| | | | |
|---|---|---|---|
| 2227719 | 11/1974 | France | 297/130 |
| 432762 | 3/1948 | Italy | 280/47.36 |
| 252658 | 10/1948 | Switzerland | 280/47.36 |
| 215125 | 5/1924 | United Kingdom | 280/47.36 |

*Primary Examiner*—Brian Johnson
*Attorney, Agent, or Firm*—Baker & Daniels

[57] ABSTRACT

A multi-functional child carrier device including a base having a detachable seat, the backrest portion detachably connectable to the base and slots formed within both the back-rest and the base to allow the unit to serve as a child safety seat or as an infant carrier seat utilizing only the backrest. The device includes elevation supports secured and retractable within the base for supporting the base in an elevated position so that the device may function as a child's chair. Wheels are attachable to the elevation supports so that the device may function as a stroller. Extension members may be attached to the retractable legs for further elevation of the device, thereby allowing the device to function as a high chair. Upon removing the backrest portion, and inserting the appropriate seats on the base, the device may function as either a potty-chair or a walker. In addition, the base is configured in such a manner that if inverted, the unit may function as a rocking chair for a small child. Alternatively, the unit may function as a rocking chair in its upright position. In addition, the base may function as a booster seat for an older child, while the base is detached from the backrest position.

2 Claims, 6 Drawing Sheets

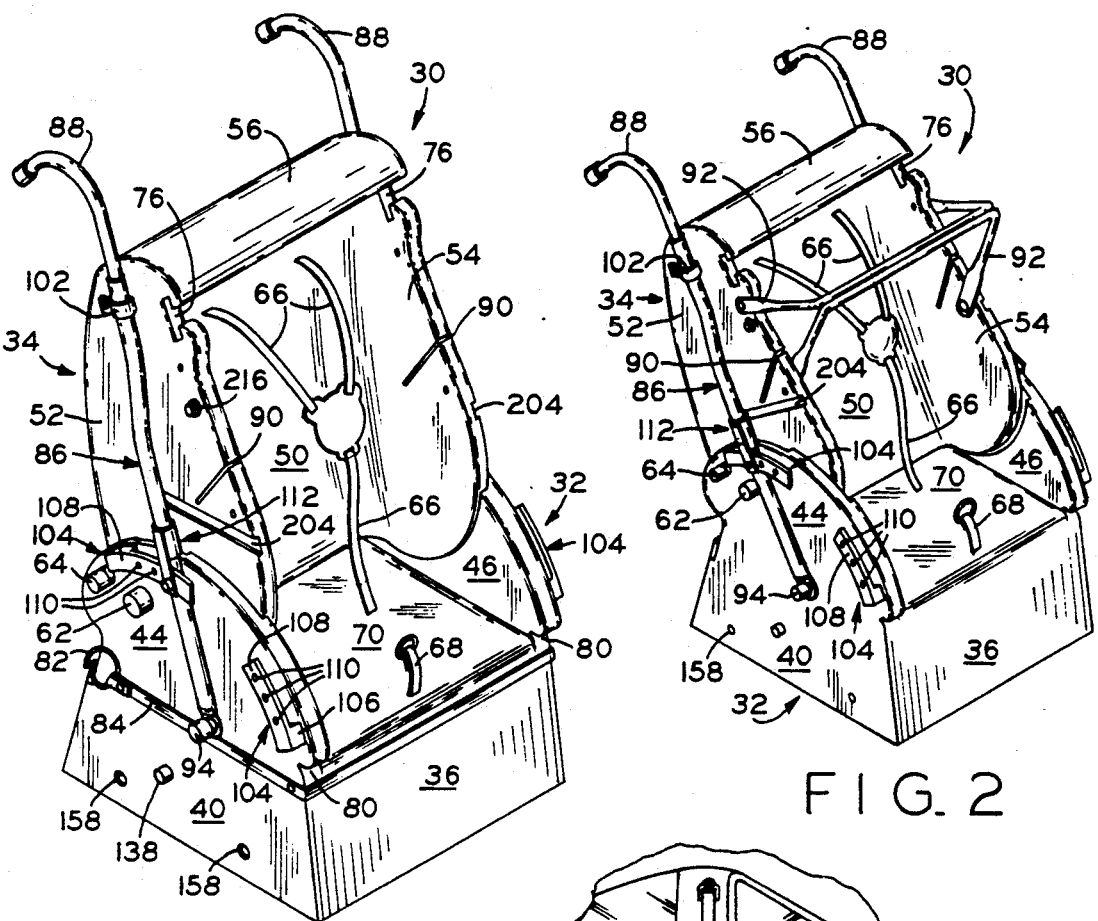
FIG. 1
FIG. 2
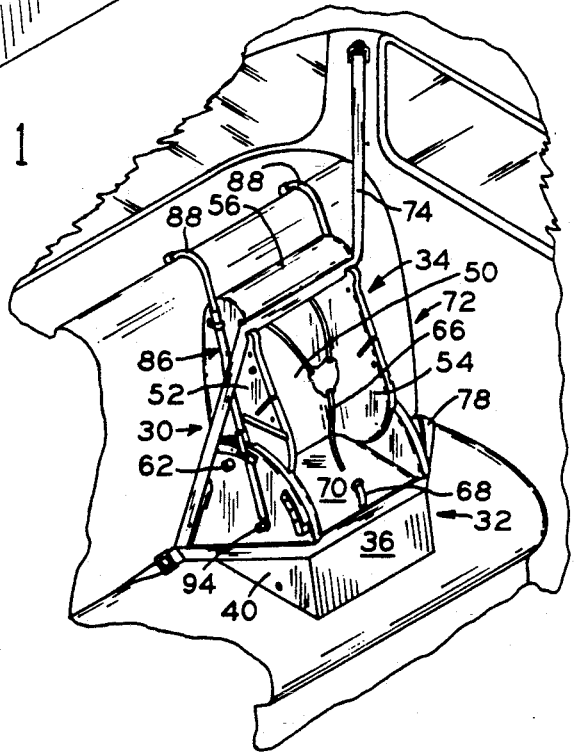
FIG. 3

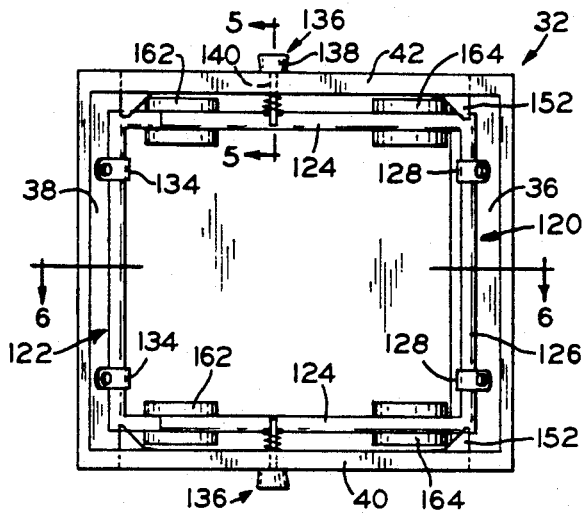

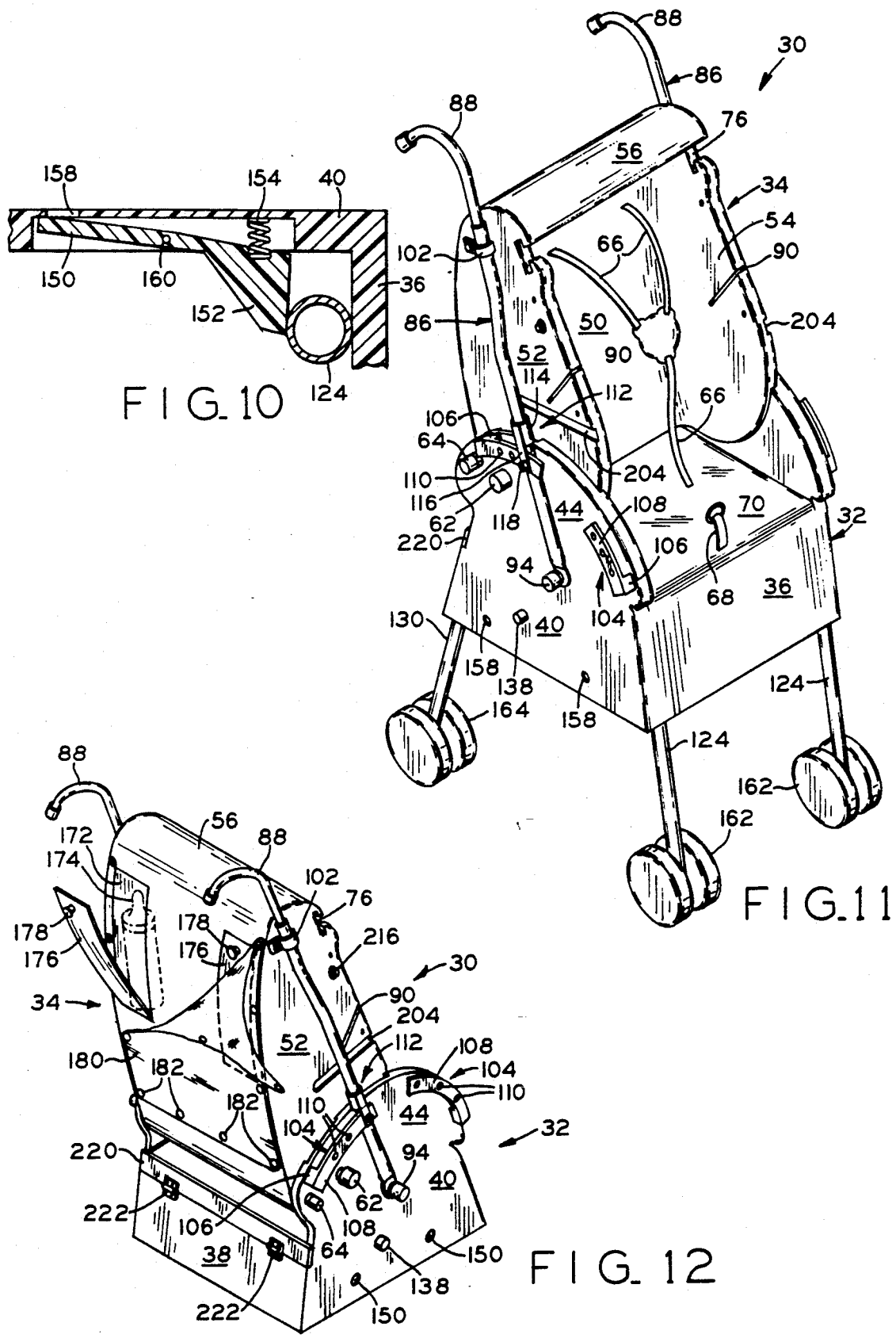

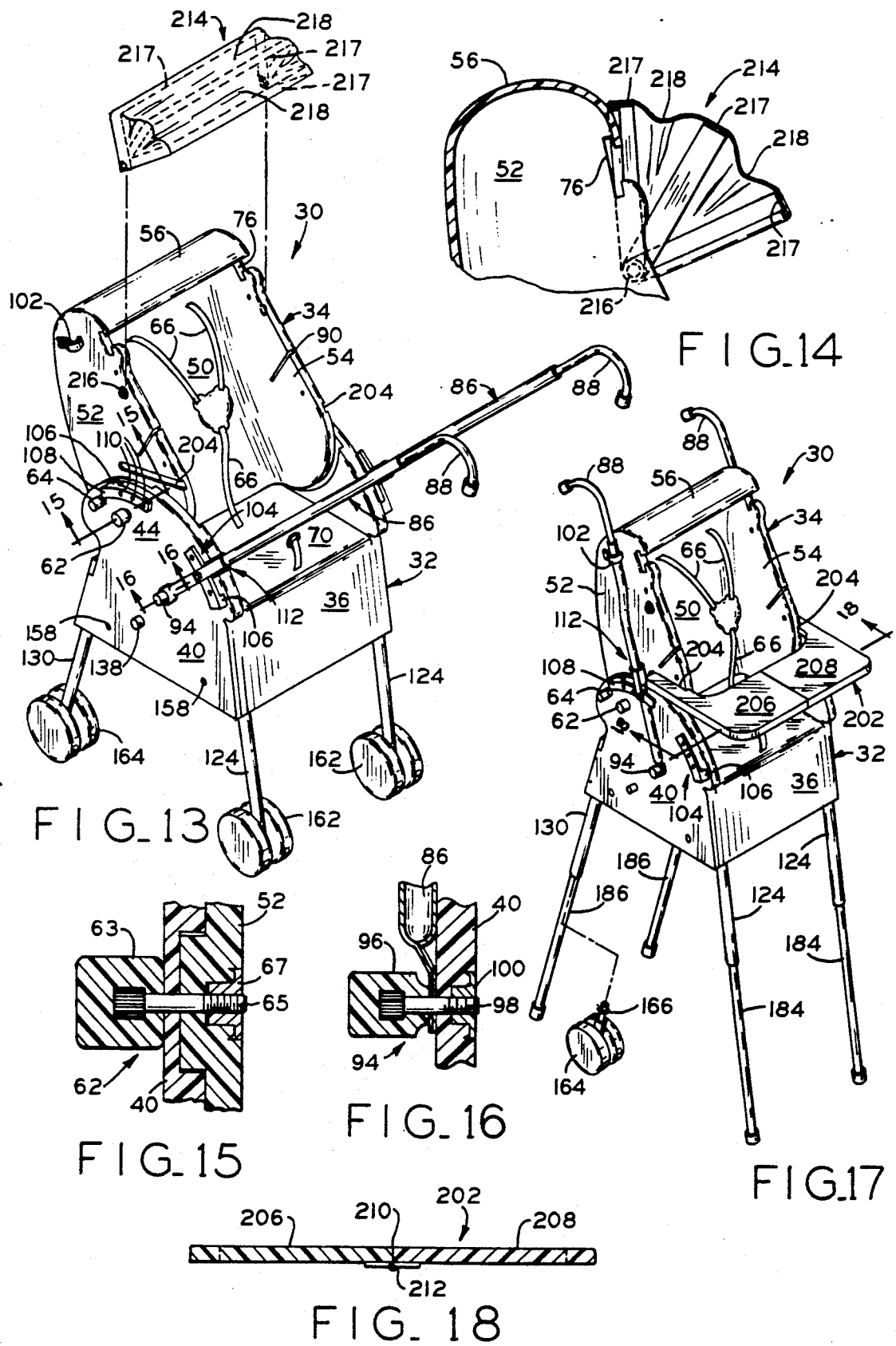

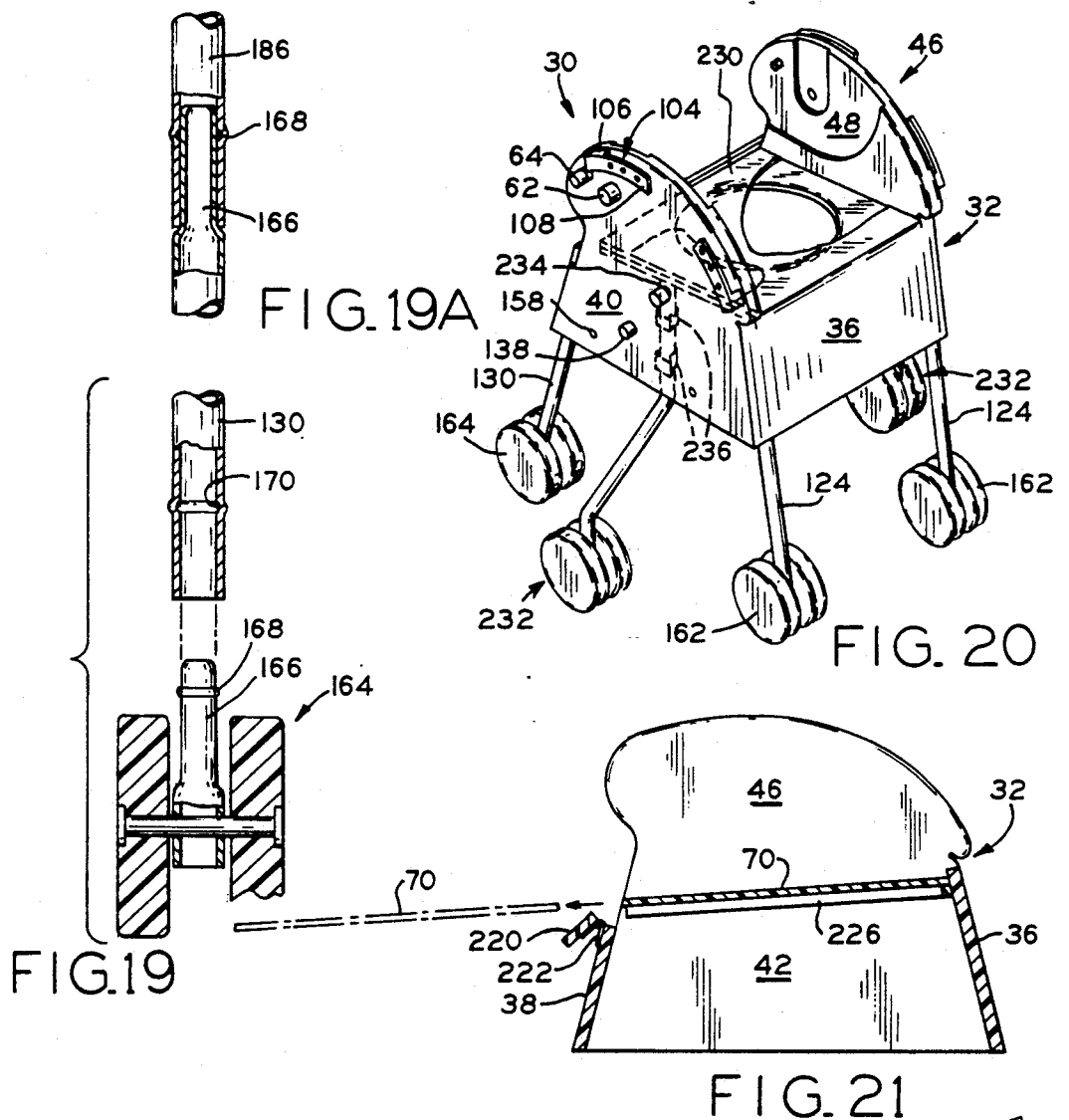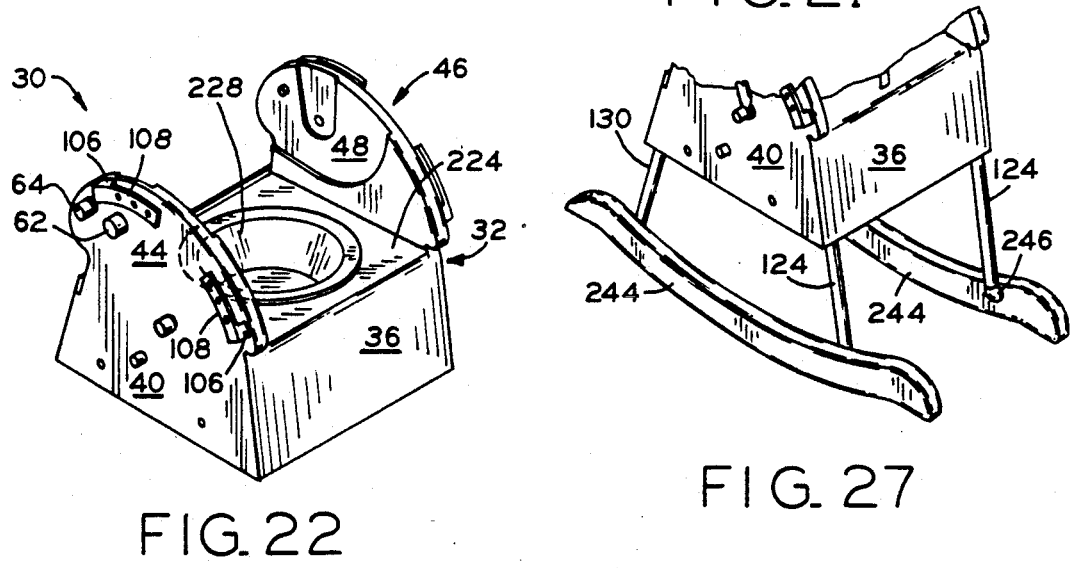

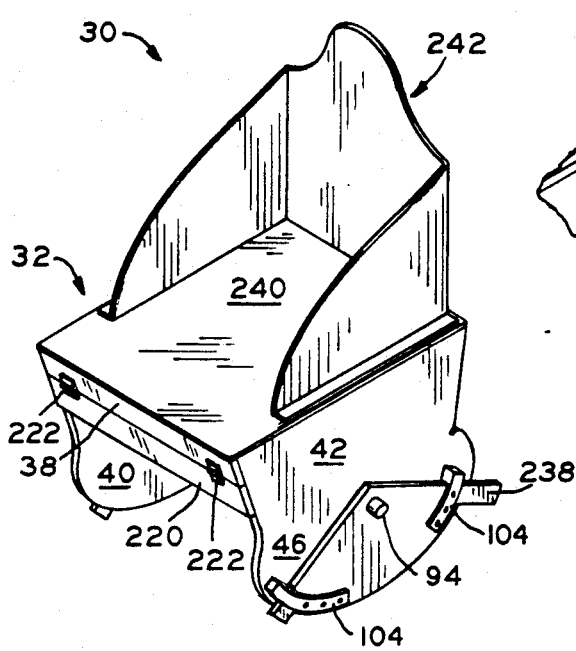
FIG. 23
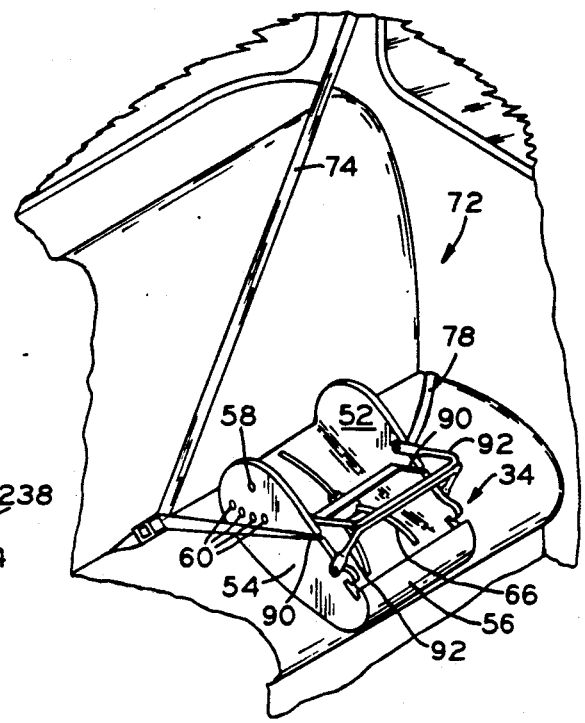
FIG. 24
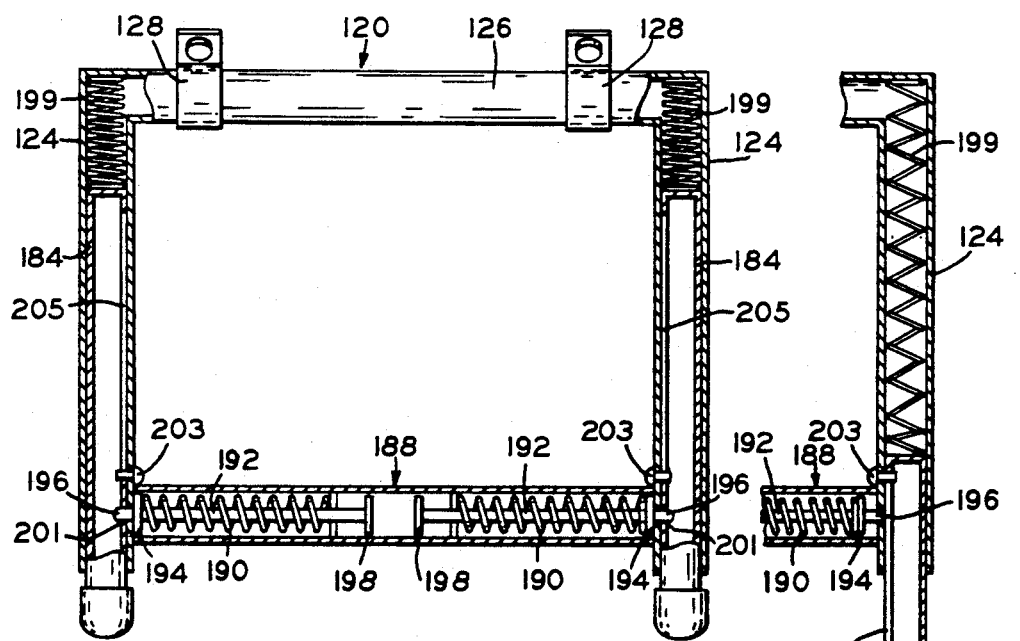
FIG. 25
FIG. 26

MULTI-FUNCTIONAL CHILD CARRIER DEVICE

BACKGROUND OF THE INVENTION

The present invention relates generally to combination child restraint-stroller devices, and more particularly to such a device that is readily convertible between a child restraint seat for a motor vehicle and a stroller.

Strollers have long been utilized to transport babies and young children. Traditionally, strollers have been foldable into various configurations for storage. However, once folded, such strollers have not been useful for any other purpose. Presently, child safety restraint seats are required by law when transporting an infant or young child in a motor vehicle. Accordingly, there have been developed child restraint-stroller devices that are readily convertible between a child restraint seat inside the motor vehicle and a stroller outside the motor vehicle so that the child may be transported in a single device.

It is desired to provide a restraint-stroller device that may be utilized for a variety of child transporting and restraint functions.

SUMMARY OF THE INVENTION

The present invention provides a multi-functional child carrier device including a base, a backrest portion detachably connectable to the base, elevation support members retractably secured within the base for supporting the base, and a detachable seat connected to the base so that the device is convertible to a variety of positions to perform a variety of useful functions.

An advantage of the device of the present invention is that it provides a compact and convenient unit to perform a wide variety of functions thereby eliminating the need to buy a separate device to perform each function.

Another advantage of the present invention is that significant cost savings is achieved since only a single unit would need to be purchased.

Other advantages of the invention will become apparent from following the description of the preferred embodiment when taken in conjunction with the drawings.

The present invention, in one form thereof, provides a multi-function child carrier unit including a base having a detachable seat and a backrest portion connected to the base. Elevation supports are secured to the base for supporting the base in an elevated position so that the unit may function as an elevated chair. The elevated supports are retractable to the base so that the unit may function as a child safety seat while the support is in a retracted position. The backrest portion is detachable from the base so that the backrest portion may function as a portable infant carrier and an infant safety seat.

The present invention further provides, in one form thereof, a multi-function child carrier unit including a base having a detachable seat and a backrest portion rotatably connected to the base. The unit is designed to function as a child safety seat. The backrest portion is detachable from the base so that the backrest portion may function as a portable infant carrier. The base portion has an opening therein, which is coverable by the removable seat.

BRIEF DESCRIPTION OF THE DRAWINGS

FIG. 1 is a front perspective view of the multi-functional device according to the present invention, wherein the device is in the form of a child safety restraint seat;

FIG. 2 is a view of the device of FIG. 1, wherein the backrest portion is shown rotated to a reclined position;

FIG. 3 is a view of the device of FIG. 1, particularly showing the device positioned on a motor vehicle seat in a forward facing position;

FIG. 4 is a bottom view of the embodiment shown in FIG. 1, particularly showing the legs in a retracted folded position;

FIG. 5 is an enlarged fragmentary sectional view of the device according to FIG. 4, taken along the line 5—5 in FIG. 4, particularly showing a leg release mechanism supporting a leg of the device;

FIG. 5A is an alternative embodiment of the leg release mechanism of FIG. 5;

FIG. 6 is a fragmentary sectional view of the device according to FIG. 4, taken along the lines 6—6 in FIG. 4;

FIG. 7 is a bottom view of the embodiment shown in FIG. 1, particularly showing the front legs in an extended position;

FIG. 8 is a fragmentary side sectional view of the device shown in FIG. 7, taken along line 8—8 in FIG. 7;

FIG. 9 is a view of the device shown in FIG. 8, particularly showing both the front legs and rear legs in an extended position;

FIG. 10 is an enlarged fragmentary sectional view of the device according to FIG. 9, taken along the line 10—10 in FIG. 9;

FIG. 11 is a front perspective view of the multi-functional device according to the present invention, wherein the device is in the form of a stroller;

FIG. 12 is a rear perspective view of the device of FIG. 1;

FIG. 13 is a view of FIG. 11, particularly showing the handles rotated to a forward position and the attachment of a sun cove to the backrest;

FIG. 14 is an enlarged sectional view of the attachment of the sun cover to the backrest;

FIG. 15 is an enlarged fragmentary sectional view of the device according to FIG. 13, taken along line 15—15 in FIG. 13;

FIG. 16 is an enlarged fragmentary sectional view of the device according to FIG. 13, taken along line 16—16 in FIG. 13;

FIG. 17 is a front perspective view of the multi-functional device according to the present invention, wherein the device is in the form of a high chair;

FIG. 18 is an enlarged fragmentary sectional view of the device of FIG. 17, taken along line 18—18 in FIG. 17;

FIG. 19 is an enlarged fragmentary sectional view of a leg and wheel attachment according to the present invention;

FIG. 19A is view of FIG. 19, particularly showing the retaining stem of the wheel frictionally secured within a leg of the device;

FIG. 20 is a front perspective view of the multi-functional device according to the present invention, wherein the device is in the form of a walker;

FIG. 21 is a partial sectional view of the device of FIG. 20, particularly showing the removal and insertion of a seat member;

FIG. 22 is a front perspective view of the multi-functional device according to the present invention, wherein the device is in the form of a potty-chair;

FIG. 23 is a front perspective view of the multi-functional device according to the present invention, wherein the device is in the form of a rocking chair;

FIG. 24 is a view of the backrest portion of the device according to the present invention, particularly showing the backrest positioned on a motor vehicle seat and facing the motor vehicle seat, wherein the backrest is in the form of an infant carrier seat;

FIG. 25 is an isolated sectional view of the legs of the present invention, particularly showing the leg extenders in a retracted position and being telescopingly received within the legs of the device; and FIG. 26 is a fragmentary view of FIG. 25, particularly showing an extension leg in an extended position.

FIG. 27 is a fragmentary perspective view of the device of the present invention, particularly showing rocker attachments attached to the ends of the legs to allow the device to function as a rocking chair.

DESCRIPTION OF THE PREFERRED EMBODIMENT

Referring now to the drawings, and in particular to FIG. 1, there is shown a multi-function child carrier device 30 according to the present invention, including a base 32 and a backrest portion 34 that is detachably connected to base 32. Preferably, carrier device 30 is made from a high-impact plastic material. Base 32 includes a front panel 36, a back panel 38, and side panels 40 and 42. Panels 40 and 4 include integrally formed semi-circular side wings 44 and 46, respectively. As best shown in FIGS. 20 and 22, side wings 44 and 46 each includes a recessed portion 48 which is adapted to receive backrest portion 34. Referring again to FIG. 1, backrest portion 34 generally includes a back portion 50, two integrally formed sidewalls 52 and 54, and an integrally formed head portion 56. Sidewalls 52 and 54 each includes a central opening 58 and a plurality of peripheral openings 60, as shown in FIG. 24.

In order to quickly and conveniently attach backrest portion 34 to base 32 sidewalls 52 and 54 are placed in recesses 48 until openings 58 are aligned with openings (not shown) in side wings 44 and 46 to allow threaded fasteners 62 to be inserted therethrough. Referring to FIG. 15, threaded fastener 62 includes a handle portion 63, a threaded screw portion 65, and an internally threaded nut 67 securably attached to a respective side 52, 54. Next, one of the plurality of peripheral openings 60 on each of sidewalls 52 and 54 is aligned with a respective opening (not shown) in side wings 44 and 46 to allow spring-loaded fasteners 64 to be inserted therethrough. If it is desired to pivot backrest portion 34 with respect to base 32, threaded fasteners 62 and spring-loaded fasteners 64 are removed from their respective openings sufficient to rotate portion 34 to a desired angular position, whereupon a new peripheral opening 60 on each of sidewalls 52 and 54 is secured to base 32 by spring loaded-fasteners 64. Threaded fasteners 62 may then again be tightened to prevent any movement of backrest portion 34 with respect to base 32. FIG. 2 illustrates carrier device 30 in one of a plurality of possible reclined positions.

Referring again to FIGS. 1-3, child carrier device 30 is in the form of a child safety restraint seat. The restraint seat includes a plurality of safety straps 66 secured to backrest portion 34 and a safety strap 68 secured to seat 70 of base portion 32. Safety straps 66 and 68 are secured in a conventional manner to comply with federal regulations relating to child safety seats and to provide an extra measure of safety for a child when the device is used as an infant carrier seat which will be described hereinafter.

In order to attach child carrier device 30 to an automobile seat, such as a seat 72 shown in FIG. 3, upper seat belt 74 is threaded through slots 76 in backrest portion 34, and lower seat belt 78 is threaded in slots 80 in base 32. If upper seat belt 74 is not long enough to extend through slot 76, rings 82, which may be optionally attached to base 32 by a strap 84, are provided, as shown in FIG. 1, to allow upper seat belt 74 to be threaded therethrough. Strap 84 may be made of metal, cloth, or another suitable material. If desired, handles 86, which are removably attachable to backrest portion 34 and base 32, are provided and include hooked portions 88 which wrap around the top edge of automobile seat 72, as shown in FIG. 3, to provide further stability to child carrier device 30. Hooked portions 88 may be telescopingly received within handle 86 by a fastener (e.g. snap rings) to vary the axial length of hooked portions 88 to a desired height.

Referring now to FIG. 24, backrest portion 34, when removed from base 32, may function as an infant carrier seat that may be strapped into automobile seat 72. As best shown in FIGS. 1, 2, and 24, backrest portion 34 includes angularly extending slots 90 into which lower seat belt 78 may fit to secure backrest portion 34 to automobile seat 72. Convenient carrying handle 92 may be removably attached to sidewalls 52 and 54 for carrying backrest portion 34 when used as an infant carrier seat. Handles 92 are pivotable so that they may be moved out of the way when the unit is not being used as an infant carrier seat. Base 32, when detached from backrest portion 34, may function as a booster seat for an older child.

As noted earlier, handles 86 are secured to both base 32 and backrest portion 34. In particular, these generally tubularly shaped handles include an opening (not shown) at one axial end thereof through which is inserted a threaded fastener 94, as best shown in FIG. 16. Threaded fastener 94 includes a handle portion 96, a threaded screw portion 98, and an internally threaded nut 100 securably attached to each of side panels 40 and 42. Handles 86 are secured to sidewalls 52 and 54 of backrest portion 34 by resilient spring clips 102, which are attached to sidewalls 52 and 54. Handles 86 may be rotated to a plurality of selected angular positions with respect to base 32, as shown in FIGS. 1, 2, and 13. In order to secure handles 86 to base 32 after rotation, a pair of arcuate locking members 104 are secured to each of side wings 44 and 46. Each locking member 104 is integrally formed with a respective side wing 44, 46 and includes a support portion 106 and an elongate portion 108 having a plurality of equally spaced openings 110 axially spaced along portion 108. Each of openings 110 defines a particular angular position of backrest 34 with respect to base 32. A locking pin assembly 112 is secured to each handle 86 and includes a generally cylindrical portion 114 that telescopingly receives respective handle 86. A protruding portion 116 is integrally formed with cylindrical portion 114 (FIG. 11). A fastener 118, such as a screw, is secured to the cantilevered end of protruding portion 116, so that fastener 118 may be received within a selected opening 110 and a locking member 104.

When it is desired to rotate handles 86, for example from the position shown in FIG. 11 to the position shown in FIG. 13, threaded fasteners 94 are loosened from base 32, fasteners 118 are removed from openings 110, and the upper portions of handles 86 are removed from resilient spring clips 102. Each handle 86 is then rotated to either another opening 110 on the same arcuate locking member 104 or to an opening 110 on the adjacent locking member 104 until fastener 118 is aligned and inserted through the desired opening 110. Threaded screw portions 94 are then tightened to secure handles 86 in position.

Referring now to FIGS. 4-10, there are shown two generally tubular U-shaped elevation members 120 and 122. Elevation member 120 includes two leg members 124 and a middle support member 126 that is pivotally secured to the inner surface of front panel 36 by a pair of "omega" shaped clips 128. Similarly, U-shaped elevation member 122 includes two leg members 130 and a central support member 132 that is secured to the inner surface of back panel 38 by a pair of "omega" shaped clips 134.

As shown in FIGS. 6-9, U-shaped elevation members 120 and 122 are pivotable to allow legs 124 and 130 to extend beneath base 32 to elevate base 32 for a variety of different functions. Members 120 are pivotable between a "retracted" position, as shown in FIGS. 4 and 6, and a fully extended position as shown in FIG. 9. As shown in FIGS. 7 and 8, elevation member 120 is first rotated to an extended position, and thereafter, elevation member 122 is rotated so that leg members 124 and 130 extend downwardly of base 32 as shown in FIG. 9. In order to retain elevation members 120 and 122 in their fully retracted positions, a spring-loaded "pull"-type retainer 136 is shown, which includes a handle portion 138, a rod 140 threadedly secured to handle portion 138 and including an opposite tapered end 142, and a spring 144 that is helically wrapped around a portion of tapered end 142 so that retainer 136 is spring biased in the extended position shown in FIG. 5. Retainer 136 may be detachable from side panels 40 and 42, if desired, while leg members 124 and 130 are in their extended positions. In this case, a portion of rod 140 would be housed by a cylindrical sleeve (not shown) and secured by a nut (not shown). In order to remove retainer 136, the nut and sleeve would first be removed, thereby allowing rod 140 to be slid out from its respective side panel.

As shown in FIGS. 4 and 7, a pair of pull type retainers 136 are provided, one being secured to side panel 40 and another to side panel 42. Upon pulling handle 138 until stop member 146 engages the inner surface of a respective side panel 40, 42, rod 140 is moved so that legs 124 and 130 are no longer supported by rod 140 and "fall" into the extended position shown in FIG. 9. In order to return legs 124 and 130 to their retracted positions, U-shaped elevation member 122 is first rotated upwardly into base 32 until legs 130 "clear" tapered edge 142 of retainer 136, thereby being again supported by rod 140. Next, elevation member 120 is rotated and locked in a similar manner.

In order to lock leg members 124 and 130 in their extended positions, as best shown in FIGS. 5A and 10, four lever-type retainers 148 are provided each including an actuation end 150 and an enlarged, tapered, spring-loaded end 152 that engages and retains a leg member in place. A spring 154 biases spring-loaded end 152 in an extended position so that, as leg member 124 is rotated to its extended position, the leg member will slide along edge 156 of tapered portion 152 until the leg "clears" end 152, thereby allowing end 152 to again extend to its spring-biased position and retain the leg member in its downwardly extending position. In order to unlock leg members 124 and 130 from their locked extended positions, actuation end 150 of each of the lever type retainers 148 is depressed through a respective opening 158 in respective side panels 40 and 42, thereby pivoting each respective lever retainer 148 about pivot point 160 to retract spring loaded end 152 with respect to side panels 40 and 42. The pivoting of retainer 148 allows leg members 124 and 130 to clear ends 152 and return to their retracted positions within base 32.

Child carrier device 30 may be converted from its function as a child safety seat as shown in FIGS. 1-3 to its function as a stroller as shown in FIG. 11 by simply pulling handle portions 138 as described heretofore to allow legs 124 and 130 to extend downwardly. Legs 124 and 130 include wheels 162 and 164, respectively, which may be permanently secured thereto and retractable therewith into the base as shown in FIGS. 4 and 6. Alternately, the wheels may be detachable as shown in FIGS. 17 and 19. The wheels are preferably swivel-type wheels that are lockable. Referring in particular to FIG. 19, a detachable wheel 164 is shown including a connecting stem 166 having integral therewith a generally circular flanged portion 168. Stem 166 is telescopingly received into leg 124 until flanged portion 168 is received within a slight annular recess 170 of leg 130. Stem 166 is frictionally retained within leg 130 until it is desired to remove wheel 162, whereupon stem 166 is merely pulled out of leg 130, so that flanged portion 168 will become dislodged from annular recess 170. If legs 124, 130 include detachable wheels, the device may function as a child's chair by removing the wheels and attaching plastic stops (not shown) to the axial ends of legs 124 and 130.

Referring now to FIG. 12, there is shown a pair of compartments 172 within backrest portion 34 for holding a variety of items such as a milk bottle 174. Each compartment 172 is covered by a rotatable flap member 176 that is fastened shut by a snap fastener 178. Additionally, a pouch cover 180 may be provided and secured to backrest portion 34 by a plurality of snap-type fasteners 182 to allow a user to store larger items such as diapers between pouch cover 180 and the back surface of backrest portion 34.

Referring now to FIG. 17, there is shown child carrier device 30 in the form of a high chair. More particularly, there are shown leg members 124 and 130 in their extended positions wherein extension members 184 and 186, respectively, are telescopingly received within the axial ends of the leg members thereby elevating base 32 sufficiently so that child carrier device 30 functions as a high chair. Extension members 184 and 186 may be manually inserted into the axial ends of leg members 1 24 and 130 and frictionally retained therein. Alternatively, as shown in FIGS. 25 and 26, extension members 184 and 186 may be telescopingly retractable within a respective leg member and spring-actuated to an extended position.

In particular, FIG. 25 illustrates front U-shaped elevation member 120 wherein extension members 184 are telescopingly retractable within tubular leg members 124. A spring-loaded bar or tube 188 extends between leg members 124 and includes therein helical springs 190, each helically surrounding a rod 192. As shown in FIG. 25, a stop member 194 is located near an axial end of each of rods 192, wherein the axial ends 196 are biased against extension members 184 to prevent extension members 184 from extending downwardly from leg members 124. The adjacent axial ends of rods 192 include two actuation pins 198, which are manually forced toward one another when it is desired to release extension members 184 from their retracted positions. In overcoming the bias of springs 190 by forcing actuation pins 198 toward one another, rods 192 are moved axially away from extension members 184 sufficiently to permit extension members 184 to fall freely from leg members 124.

Alternatively, springs 199 (FIGS. 25 and 26) may be secured within leg members 124 to force extension members 184 downwardly. In order to return extension members 184 to their retracted positions, the user need only to manually push together pins 198 until ends 196 are loosened from extension member 184. At that point, the weight of base 32 will force leg members 124 downwardly so that extension members 184 are received with legs 124 until each end 196 of rods 192 engages a groove 201 within extension member 184, thereby frictionally retaining each of the extension members 184 within the leg members 124. Guide pins 203 and grooves 205 are provided to limit rotational movement of extension members 184, thereby improving stability as well as insuring proper seating of end 196 within groove 201. If desired, each extension member 184 may have a plurality of axially extending grooves for receiving axial ends 196 to allow the height of high chair 30 to be selectively varied.

Referring again to FIGS. 17 and 18, a slidable tray 202 is slid into slots 204 (FIG. 1) to retain tray 202 on backrest portion 34. Tray 202 includes halves 206 and 208 that are foldable together at centerline 210 against the bias of a spring 212. If desired, tray 202 may be folded and stored within pouch cover 180.

Referring again to FIGS. 13 and to FIG. 14, it is noted that reversible handles 86 allow the user the option to face the child while pushing unit 30 or to face in the same direction as back portion 50. In addition, if desired, a foldable top member 214 may be removably attached to side walls 52 and 54 by screw nut fasteners 216, as shown. Top member 214 includes support members 217 and a flexible cover 218, such that the support members 217 may be rotated at a variety of angular positions with respect to one another to allow a desired amount of sun on an occupant of device 30.

Referring now to FIGS. 12 and 21, there is shown a rotatable flap member 220 pivotally attached to back panel 38 of base 32 by a pair of brackets 222. Flap member 220 may be rotated rearwardly when it is desired to remove a seat portion such as seat portion 70 from base member 32. This is necessary so that carrier device 30 can perform a variety of functions. For example, referring to FIG. 22, a seat 224 may be inserted onto flange members 226 of side wings 44 and 46, wherein seat 224 includes a large opening sufficient to support a receptacle 228 to allow device 30 to function as a potty-chair. If desired, backrest portion 34 ma be attached to base 32 while child carrier device 30 is in its potty-chair position as long as backrest position 34 is in a completely upright position.

Referring to FIG. 20, a different seat 230 may be inserted onto flange members 226, wherein seat 230 includes two openings for receiving the legs of a child. In addition, leg members 124 and 130 may be rotated to their extended positions. Preferably auxiliary leg members 232 are attached to side panels 40 and 42 by fasteners 234 and within brackets 236 which are attached to the inner surfaces of respective side panels 40 and 42, thereby converting child carrier device 30 to a walker.

Referring now to FIG. 23, roller stops 238 may be slid between arcuate locking members 104 and respective side wings 44 and 46 of base member 32. Then, base member 32 may be inverted so that the top surfaces of side wings 40 and 42 serve to rock base member 32 back and forth. While functioning as a rocking chair, bottom surface 240 of base member 32 serves as the seat, and an attachable auxiliary backrest and handle assembly 242 may be fastened to bottom surface 240 by snap type fasteners or the like.

The device may also function as a rocking chair as shown in FIG. 27. In this embodiment, two rocker attachments 244 are secured into the axial ends of legs 124 and 130, thereby allowing the device to function as a rocking chair without the use of roller stops 238 and auxiliary assembly 242. Each rocker attachment 244 includes connecting stems 246, which are attached to the inner face of attachment 244. Stems 246 are similar to stems 166 shown in FIG. 19.

The various types of fasteners and attachments described throughout this application are merely embodiments, and other types of fasteners and attachments are considered to fall within the spirit and scope of the invention.

It will be appreciated that the foregoing is presented by way of illustration only, and not by way of any limitation, and that various alternatives and modifications may be made to the illustrated embodiment without departing from the spirit and scope of the invention.

What is claimed is:

1. A multi-functional child carrier unit comprising:
a base including a detachable seat;
a backrest portion detachably connected to said base so that said backrest portion may function as a portable infant carrier;
first mounting means for mounting the unit to a seat of a motor vehicle; and
an elevation support secured within said base for supporting said base in an elevated position, sufficient to permit the unit to function as an elevated chair;
said elevation support including pivot means for pivoting said support sufficiently to allow said support to be retractable into said base so that the unit may function as a child safety seat while said support is in a retracted position;
said backrest portion including second mounting means for mounting said backrest portion to the seat of the motor vehicle, wherein said base is inverted while said backrest portion is detached from said base so that a bottom portion of said base is upright, wherein a bottom surface is added to said bottom portion and an auxiliary backrest/handle assembly is attached to said bottom surface, said base being supported on an arcuate member so that the unit may function as a rocking chair.

2. A multi-functional child carrier unit comprising:
a base including a bottom portion and a top portion having an arcuate member, said base including a detachable seat;

a backrest portion detachably connected to said base so that said backrest portion may function as a portable infant carrier; and means for mounting the unit to a seat of a motor vehicle so that the unit may function as a child safety seat;

said base having an opening therein, wherein said base is inverted while said backrest portion is detached from said base so that said bottom portion of said base is upright, wherein a bottom surface is added to said bottom portion and an auxiliary backrest/handle assembly is attached to said bottom surface, said base being supported on said arcuate member so that the unit may function as a rocking chair.

* * * * *